May 1, 1928. 1,668,412

F. LE GUEN

LIFE SAVING DEVICE FOR SUBMARINES

Filed April 28, 1927    5 Sheets-Sheet 1

François Le Guen
INVENTOR

BY Victor J. Evans
ATTORNEY

May 1, 1928. 1,668,412
F. LE GUEN
LIFE SAVING DEVICE FOR SUBMARINES
Filed April 28, 1927 5 Sheets-Sheet 3

François Le Guen INVENTOR
BY Victor J. Evans
ATTORNEY

May 1, 1928. 1,668,412
F. LE GUEN
LIFE SAVING DEVICE FOR SUBMARINES
Filed April 28, 1927  5 Sheets-Sheet 4
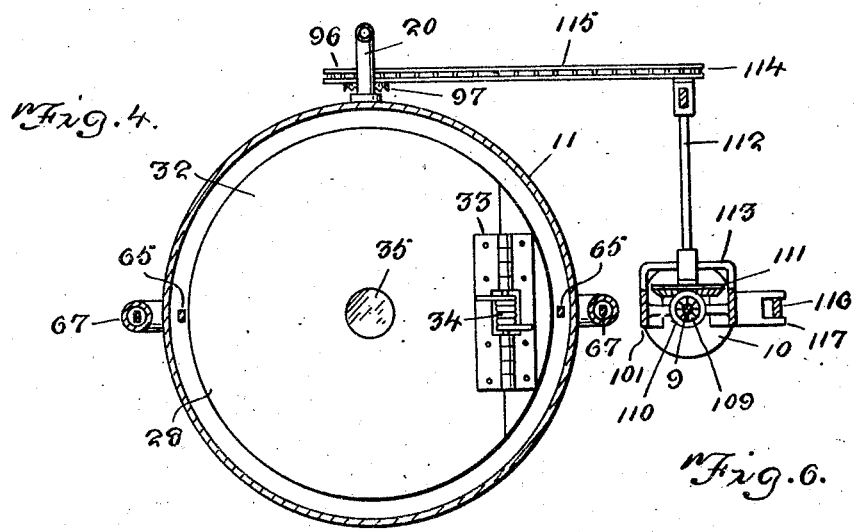
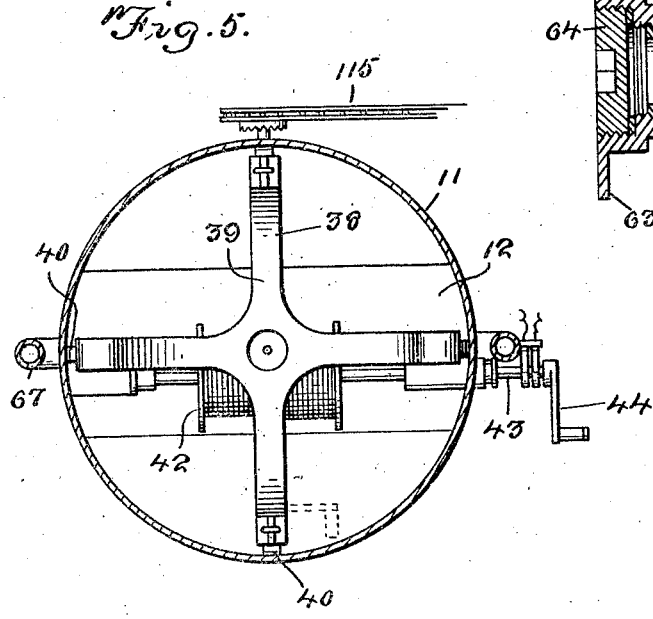
François Le Guen
INVENTOR
BY Victor J. Evans
ATTORNEY

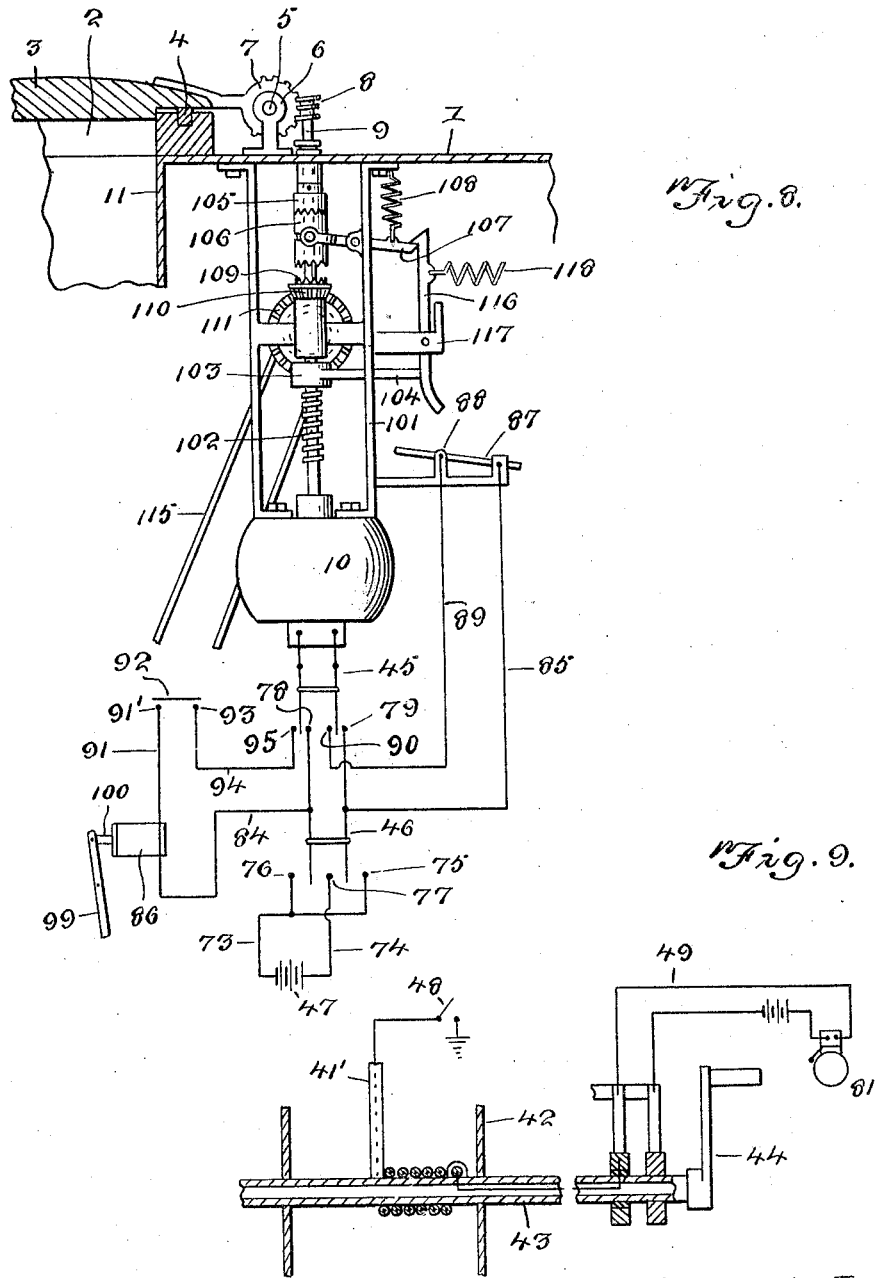

Patented May 1, 1928.

1,668,412

UNITED STATES PATENT OFFICE.

FRANÇOIS LE GUEN, OF BAYONNE, NEW JERSEY.

LIFE-SAVING DEVICE FOR SUBMARINES.

Application filed April 28, 1927. Serial No. 187,311.

My present invention has reference to a means for rescuing the crew of disabled and sunken submarine vessels.

Another object is the provision of a means for this purpose whereby each member of the crew of a sunken submarine may be individually rescued therefrom in a novel, but simple and thorough effective manner.

A still further object is the provision of a means for this purpose in which a hollow buoyant but water-proof body is arranged in a water-tight receptacle, the top of the receptacle being closed by a tightly sealed door and the side of the receptacle being provided with a manhole whereby individual members of the crew can enter the receptacle and arrange themselves in the body, there being means for filling the receptacle to buoy the body therethrough, means automatically swinging the door of the receptacle to open position to allow the passage of the body therethrough, means for returning the body into the receptacle, closing the door therefor and ejecting the water from the receptacle after the members of the crew who are equipped with life belts have reached the surface of the water and have signalled for the descent of the body, together with novel means which are practically automatic in action for flooding the receptacle, opening the door therefor and permitting the last member of the crew to be raised in the buoyant body to the surface of the water.

A further object is the provision of a means for permitting the escape of the crew of a damaged submarine without flooding the vessel, and regardless of the angle in which the vessel lies in the bed of water.

A still further object is the provision of a life-saving device for submarines that is of a comparatively simple construction, which may be arranged in the submarine without providing the same with additional hatchways and which is thoroughly reliable and efficient for its purpose.

To the atainment of the above recited objects and many others which will present themselves as the nature of the invention is better understood, the improvement also resides in certain other novel features of construction, combination and operative association of parts, one satisfactory embodiment of which is disclosed by the accompanying drawings.

In the drawings:

Figure 4 is a sectional view on the line 4—4 of Figure 3.

Figure 5 is a sectional view on the line 5—5 of Figure 3.

Figure 6 is an enlarged detail sectional view through the automatic switch which operates the motor when the last member of the crew is to make his escape in the submarine vessel.

Figure 7 is a detail sectional view to illustrate the construction of the valve, which permits of a flow of water into the chamber.

Figure 8 is an enlarged elevation illustrating the connection of the motor with the door, the buoyant body ejecting means operated by the motor and the electric circuits, parts being in section.

Figure 9 is a detail longitudinal sectional view through the drum to illustrate the manner in which the conductors for the alarm are fed through the hollow cable and through the hollow shaft for the drum, as well as the circuit for the alarm.

Figure 1:
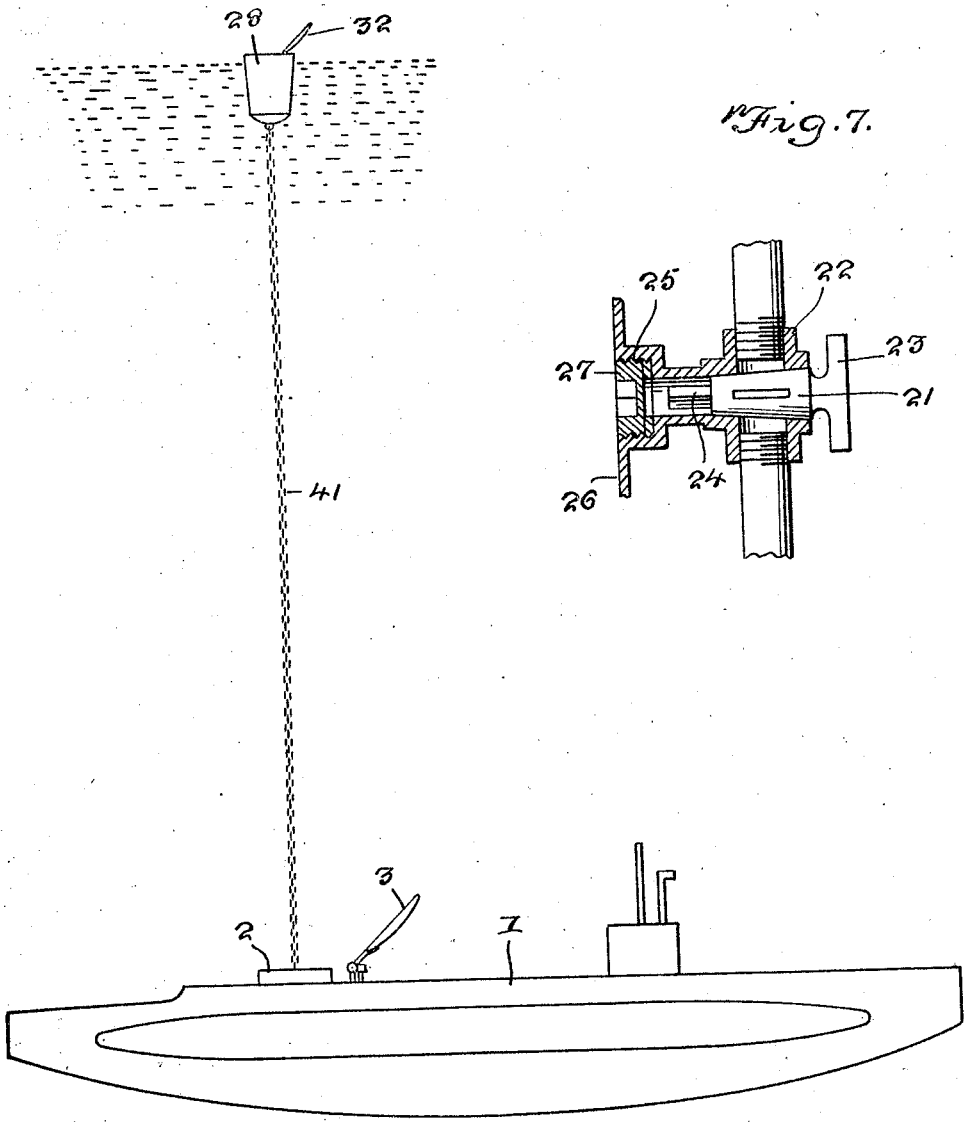
Figure 1 is a view to illustrate the manner in which the buoyant body is released from a sunken submarine and elevated to the surface of the water in which the submarine is sunk.
Figure 2:
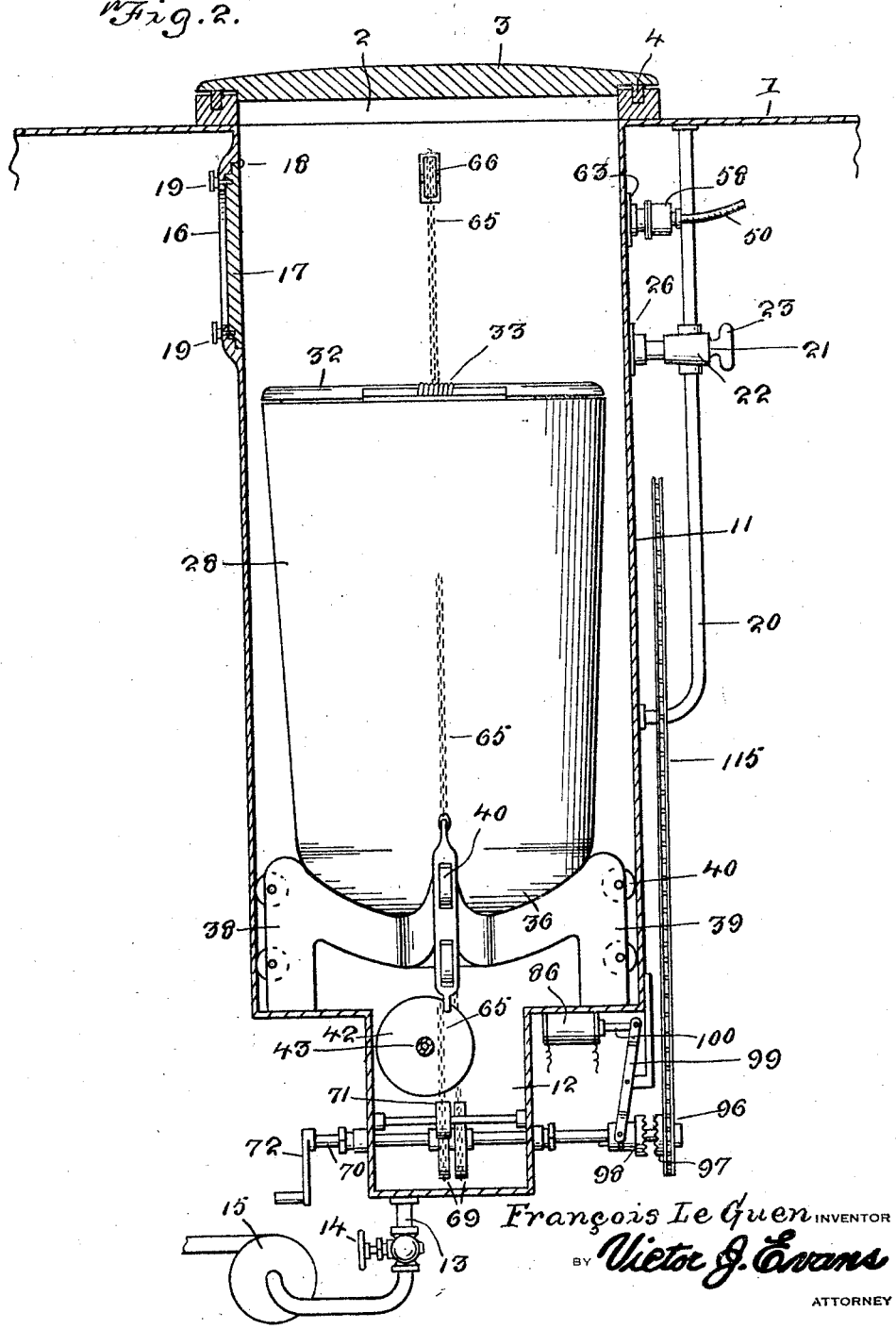
Figure 2 is an enlarged sectional view through the part of the submarine in which the improvement is arranged.
Figure 3:
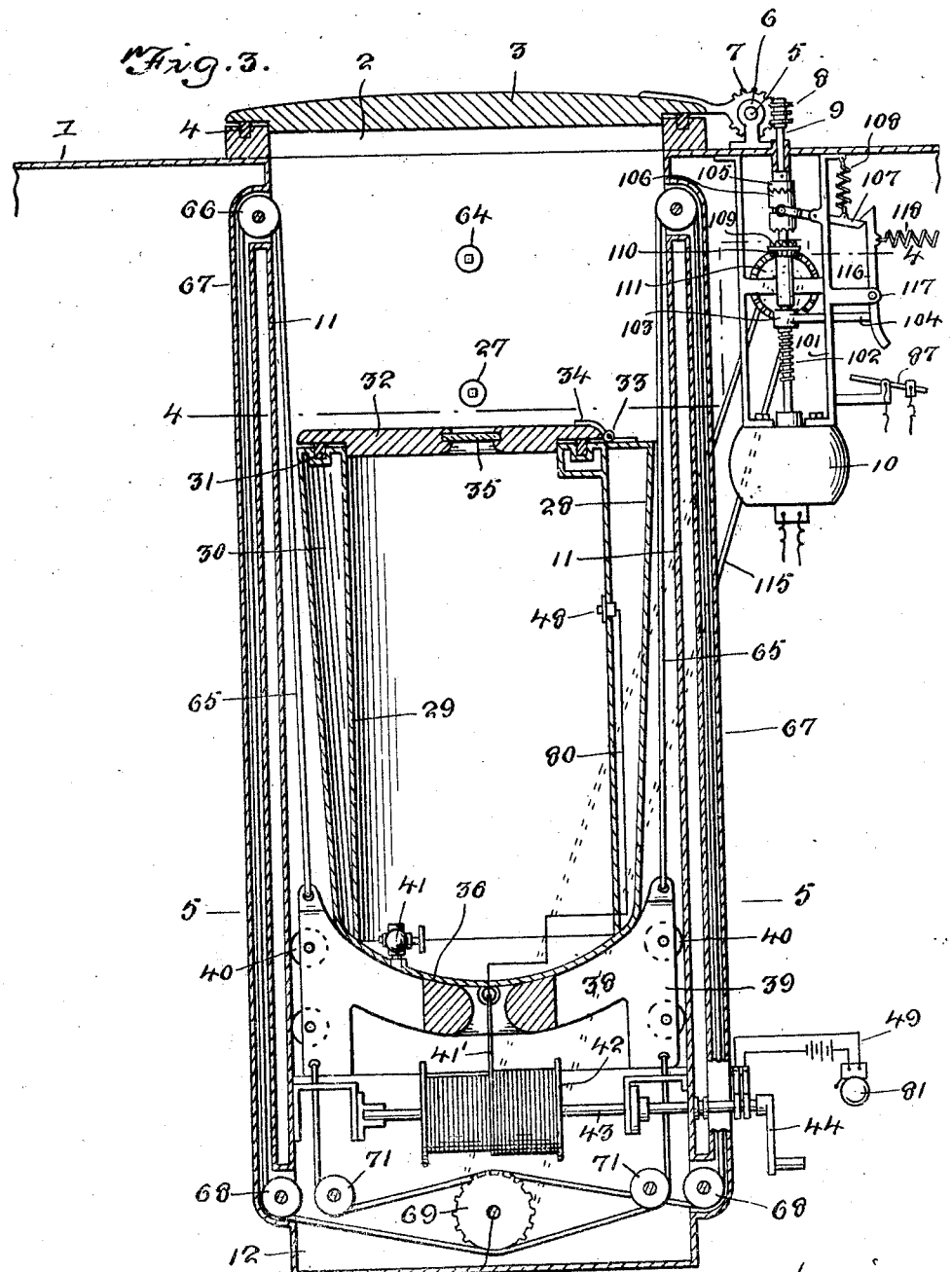
Figure 3 is a sectional view taken at right angles to the showing in Figure 2.

In the drawings, the numeral 1 designates a submarine that has a hatchway 2 normally closed by a hingedly supported door 3. The hatchway has let therein and projecting therefrom a compressible gasket 4 for establishing a water tight joint between the door and hatchway when the door is closed.

The pivot 5 between the door and the vessel is journaled in suitable brackets 6 on the top face of the vessel and the said pivot has fixed thereto a worm wheel 7 that is engaged by a worm 8 on the shaft 9 of a motor 10. In the showing of the drawings, the motor is electrically operated.

Extending into the vessel 1, in a line with the opening provided by the hatchway 2 there is a water tight chamber 11. The bottom of the chamber is preferably formed with a reduced depending portion providing what I will term a basin and which is indicated by the numeral 12. The basin 12 communicates with a water outlet pipe 13, the passage for the said pipe being controlled by a valve 14 and the pipe is connected to the intake of a suction pump 15. The outlet for the suction pump passes through an opening in the vessel 1, there being, of course, a water tight joint between this pipe and the vessel. The chamber 11, adjacent to the top thereof, and on one of its sides, has an outwardly extending flange which is preferably stepped and which surrounds an opening 16. This opening is normally closed by a door 17 which is hinged, as at 18, to the inner face of the receptacle 11. The door has its edges stepped and the said stepped portions may be provided with compressible gaskets. Latching means 19 hold the door 17 closed. The opening 16 is in the nature of a manhole and in case of emergency the door 17 may be opened and again closed and the motor 10 operated to open the door of the hatchway so that the crew of the vessel may thus escape therefrom in case of emergency. Of course, after such escape the door of the hatchway is closed and the pump 15 is operated to drain water from the receptacle 11. Communicating between the top of the vessel and one side of the receptacle 11 there is a pipe 20 which is designed to let water into the receptacle. This pipe 20 has its passage controlled by a valve plug 21 arranged in a suitable casing 22. The plug is provided with an operating handle 23 on its outer end and on its inner end with a lug extension 24. The casing 22 has a pipe extension in which the lug 24 is received and has a hollow cross sectionally rounded and interiorly threaded portion 25 extending from the said pipe extension. The portion 25 has a flanged end 26, and this end is securely fixed to the side of the receptacle 11 in a manner to establish a water tight joint. Screwed in what may be termed the barrel portion 25 of the casing 22 there is a plug 27. The purpose of this arrangement will presently be apparent.

In the receptacle 11 there is a hollow buoyant body 28. The body is preferably in the nature of a cylinder constructed to include an inner compartment 29 and an outer air tight compartment 30 which surrounds the compartment 29. This last mentioned compartment has its outer wall preferably flared from the closed bottom to the top of the body 28, there being, of course, a top wall connecting the outer compartment with the inner compartment. This top wall is preferably centrally formed with an annular depression in which there is seated a compressible gasket 31 that is contacted by a door or closure 32 that is hinged, as at 33, to the top of the said buoyant body 28. The top or closure is influenced to closed position by spring means 34 and if desired, other means may be also employed, it being, however, necessary that the door 32 be opened from both the interior of the body 28 and the exterior thereof. Let in a central opening in the door in a manner to establish a water tight seal there is a transparent plate 35.

The bottom of the buoyant body 28 is preferably rounded, as at 36, and normally rests on the inwardly arched or rounded arms 38 of a carriage 39. The outer elements or arms of the carriage 39 have journaled therein roller members 40 that contact with the inner wall of the shell. The bottom 36 of the buoyant body 28 has an opening therethrough closed by a hand operated valve 41.

Centrally fixed to the bottom 36 of the buoyant body 28 there is a cable or like flexible element 41' that is wound around a drum 42 arranged in what I have termed the basin portion of the body. The drum is fixed on a hollow shaft 43 journaled in suitable bearings in the basin and projecting through one side thereof. A suitable packing box or like means prevents water passing through the basin and the opening therein through which the shaft 43 extends and the shaft 43 has on its said extended end a crank handle 44.

The motor 10 is of a reversible type. The battery for the motor is indicated by the numeral 47, the wires leading therefrom by the numerals 73 and 74, respectively. The wire 73 is provided with two spaced contacts 75 and 76, while the wire 74 is provided with a contact 77 arranged centrally between the contacts 75 and 76. The wires for the motor have connected therewith a double switch 45. The numeral 46 designates a second double switch having wires leading therefrom which terminate in contacts 78 and 79, respectively, and these contacts are arranged opposite and engageable with the switch 45. When the switch 45 is thrown to engage with the contacts 78 and 79 and the switch 46 is thrown to engage with the contacts 75 and 77, the motor turns its shaft 9 in a direction to cause the worm 8 to engage with the worm wheel 7 to turn the pivot 5 and swing the door 3 to open position. Of course, the switches 45 and 46 are not thrown until after the said member or members of the crew enter the buoyant body 28 and the door 32 therefor is tightly closed by the member or members of the crew in the said body 28. Also it is to be understood that the motor is not operated to open the door 3 until water is admitted into the water receptacle or tank 11 in a quantity sufficient to buoy the body 28 adjacent to the top of the said receptacle 11. This is accomplished by the opening of the valve 21 by one of the members of the crew in the submarine. The buoyant body, with its occupants will now pass through the receptacle 11 and out of the submarine, the body 28 being buoyed to the surface of the water, as illustrated by Figure 1 of the drawings.

Before opening the door the person or persons in the body will observe, through the sight opening 35, that the surface of the water has been reached. It is, of course, to be understood that the member or members of the crew thus buoyed to the body surface are provided with life-belts or other apparatus that will enable them to swim or float to a point of safety.

Before leaving the buoyant body the rescued member or members of the crew signal the remaining occupants of the disabled submarine that the surface of the water has been reached. This is accomplished by directing a circuit wire 80 along the side and through the bottom of the body 28, the said wire being likewise directed through the cable 41'. It should have been stated that the cable 41' is hollow or has a central opening therethrough and the wire 80 is directed from the cable through the hollow shaft 43 and from thence to an alarm such as an ordinary electrically operated bell 81, the second wire from the bell being connected with a battery and being grounded, as clearly disclosed by Figure 9 of the drawings. A push button 48 arranged in the compartment 29 in the body 28 is operated for sounding the bell. When the bell is sounded the crank handle 44 is operated to turn the shaft 43 and the drum thereon in a reverse direction, and thus draw on the buoyant body 28 to return the same into the receptacle 11. When this is accomplished the switch 46 is thrown to engage with the contacts 77 and 76 of the circuit for the motor which reverses the motor, causing the shaft 9 to turn in an opposite direction and close the door 3. When the door is closed the switch 46 is brought to neutral position with respect to the contacts 76 and 77. The pump 15 is again brought into operation to suck all of the water out of the receptacle. The rescued members of the crew should close the door 42 before signaling for the return of the buoyant body, but any water seeping into the said body may be drained by opening the cock or valve 41. This method of raising and lowering the buoyant body is continued until all except the last member of the crew escapes.

Connected to the wires between the double switch 46 and the contacts 78 and 79 there are auxiliary wires 84 and 85, the wire 84 leading to an electro-magnet 86 and the wire 85 leading to a contact 87 leading to a switch member. The switch is preferably spring influenced and is in the path of engagement with the contact 88 for a wire 89 that terminates in a contact 90 disposed between the contacts 78 and 79. The second wire from the electro-magnet 86 is indicated by the numeral 91, and terminates in a contact 91'. Opposite the contact there is a switch 92 that is also engageable with a contact 93, on one end of a wire conductor 94 the second end of the wire being provided with a contact 95 disposed opposite the contact 78. The switch 92 is of a particular and peculiar construction and is designed to be automatically influenced by the pressure of water from the interior of the receptacle 11. The circuit wires 91 and 94 enter an insulator block 52, the contacts for the said wires being embedded in and projecting beyond the inner face of the block. The opposite or other face of the block 52 has a reduced extension which is received in a socket in a second insulator block 53, and both of these blocks are encased in a metal sleeve 54. The central and reduced extending portion 56 of the insulator block 53 passes through the hub portion 57 of a cap member 58 that is screwed on the sleeve 54. The sleeve has an inner shoulder 59 against which rests a compressible gasket 60, and embedded in this gasket and arranged opposite the contact for the wires 91 and 94 there is the switch 92. Screwed in the sleeve 54 there is a ring member 62 that holds the flexible disc 60 against the shoulder 59. The end of the sleeve is enlarged and formed with a flange 63 and this flange is secured to the side of the receptacle 11 adjacent to the top thereof. The bore of the sleeve communicates with an opening in the receptacle 11 and this bore is normally closed by a screw plug 64.

Attached to the top of the carriage 39 there are oppositely arranged chains 65 trained around sheave wheels 66 journaled adjacent to the top of the receptacle 11. The sheave wheels are arranged in the ends of guide casings 67 disposed at the sides of the receptacle 11, and through these guide casings the chains 65 are directed. The chains 65 are trained around sheave wheels 68 in the bottom of the hollow guide 67, so that the same enter the basin 12 of the receptacle 11. The lower leads of the chains are directed respectively over the top and bottom of toothed wheels 69—69. The shaft 70 for the toothed wheels 69 is journaled in bearings in the basin, the ends of the shaft passing through packing boxes in the sides of the basin. The ends of the chains are trained over grooved wheels 71 and are secured to the bottom of the carriage 39. One of the projecting ends of the shaft 70 is provided with a removable operating handle, the second end of the said shaft having freely turnable thereon a sprocket wheel 96 having an inner clutch face 97. There is slidable on a spline on this end of the shaft a clutch member 98. The cylindrical body portion of the clutch member 98 has an annular groove in which are received pins on the forked end of a pivotally supported lever 99. The lever is connected to the armature 100 for the electro-magnet 86. In the showing of the drawings the element 86, is in the nature of a solenoid and the armature 100 is in the nature of a core for the solenoid. Obviously either a solenoid or electro-magnet may be employed.

The motor 10 is supported from an open frame 101 secured to and depending from the top of the vessel 1, and the shaft 9 for the motor has a screw portion 102. On the screw 102 there is a sleeve 103 that, of course, has a threaded bore and the said sleeve has an arm extension 104 that is guided through one of the slotted standards of the frame 101. On the shaft 9 there is an upper fixed clutch member 105 which is normally engaged by a clutch surface on a clutch sleeve 106. The clutch sleeve has an annular peripheral groove that receives pins therein on the forked end of a lever 107. The lever is pivotally secured to the frame 101 and is influenced by a spring 108 to move the clutch sleeve out of clutching engagement with the element 105 and into clutching engagement with the clutch surface 109 on a gear 110 that is mounted for free turning on the shaft 9. The sleeve 106 has a splineway that engages a spline on the shaft 9. The gear 110 is in mesh with a larger gear 111 whose shaft 112 is journaled through a bearing yoke 113 on the frame 101 and the outer end of the pivot is journaled in a suitable bearing and has secured thereon a sprocket wheel 114. Trained around this sprocket wheel and the sprocket wheel 96 on the shaft 70 there is a sprocket chain 115.

Normally engaging the clutch lever 107 there is the toothed end of an arm 116, the said arm being pivoted to an outstanding bracket 117 on the frame 101. This dog is influenced by a spring 118 in a direction away from the clutch lever 107.

The last member of the crew throws the switch 45 to bring the same against the contacts 90 and 95 and throws the switch 46 against the contacts 76 and 77. Prior to this he has cut the cable 41', and after the switches are thrown he enters the receptacle 11 through the man-hole 16. He removes the plug 27 through a suitable wrench or other instrument provided therefor. he turns the valve core 21, permitting water to slowly flow through the pipe 20 into the receptacle. He now removes the cover or plug 64 and entering the buoyant body 28 tightly closes the door 32. As the water rises the pressure thereof against the flexible disc 60 will move the switch 92 to close the circuit. This will energize the magnet or core 86, swinging lever 99 to bring the clutch member 98 into engagement with the clutch 97 on the sprocket wheel 96. The motor is, of course, in operation, but it should be stated that the dog carrying arm 116 has been operated to permit of the clutch sleeve being influenced by the spring 108 into clutching engagement with the clutch surface on the gear 110 so that the turning of the shaft will operate the sprocket wheel. The motor shaft will cause the opening of the door 3 when the buoyant body has been elevated almost to the top of the receptacle 11. The turning of the shaft 70 will cause the outward movement of the carriage through the receptacle 11 so that the buoyant body 28 is thus mechanically projected through the receptacle and out of the submarine, and in this manner the rescue of the last person in the submarine is positively assured.

Should the sunken vessel rest at an angle in the bottom of the water the parts are operated as first described but an impulse may be added to the buoyant body by the turning of the crank 72 and the shaft 70 to cause the cradle to aid in forcibly ejecting the buoyant body through the receptacle 11.

It is thought that the foregoing description, when carefully read in connection with the accompanying drawings will fully set forth the construction, combination and advantages of my improvement so that further detailed description will not be required.

Having described the invention, I claim:—

1. A means for singly delivering members of the crew from a sunken submarine vessel onto the surface of water in which the vessel is sunk, comprising a receptacle in the vessel, communicating with the exterior thereof, a motor operated door for closing the receptacle and establishing a water tight joint therefor, a normally closed man-hole for the receptacle, a water conductor between the receptacle and the exterior of the vessel, a valve controlling the passage through said conductor and operable from the interior and from the exterior of the receptacle, a removable plug between the receptacle and valve, a fluid influenced switch in the receptacle and wired to the circuit for the motor for the door, a plug normally closing said switch, a hollow buoyant body in the receptacle, a spring influenced hinged door for closing the mouth of the body and establishing a water tight joint therefor, a transparent sight opening in the door, a drain valve in the bottom of the valve, a drum having a shaft journaled in bearings in the lower portion of the receptacle and having an outer operating handle, a cable trained around the drum and connected to the buoyant body, in combination with an electric alarm in the vessel, and a switch controlling the circuit therefor in the buoyant body.

2. A means for singly raising the crew of the sunken submarine vessel to the surface of the body of water in which the vessel is sunk, comprising a receptacle in the vessel communicating with the exterior thereof, a pivotally supported motor operated door for closing the receptacle and establishing a water tight joint therefor, a switch controlled electric circuit for the motor, a switch in the receptacle also connected with said circuit, a water inlet pipe communicating between the exterior of the vessel and the receptacle, a valve controlling the passage through said pipe operable from both the exterior of the receptacle and the interior thereof, a normally closed man-hole for the receptacle, a hollow buoyant body in the receptacle, a spring influenced door for normally closing the outer end of the body and establishing a water tight joint therebetween, said door having a transparent sight opening therein, means for admitting water from the exterior of the receptacle into the receptacle to buoy the body in the receptacle prior to the operation of the motor for opening the door of the receptacle, flexible means for returning the body into the receptacle, a cradle on which the body rests and flexible means between the cradle and the receptacle operable from the exterior of said receptacle for partially projecting the body through the receptacle.

In testimony whereof I affix my signature.

FRANÇOIS LE GUEN.